March 8, 1949.   B. J. SHELTON   2,463,568
SHAFT SEAL CONSTRUCTION
Filed Aug. 11, 1945
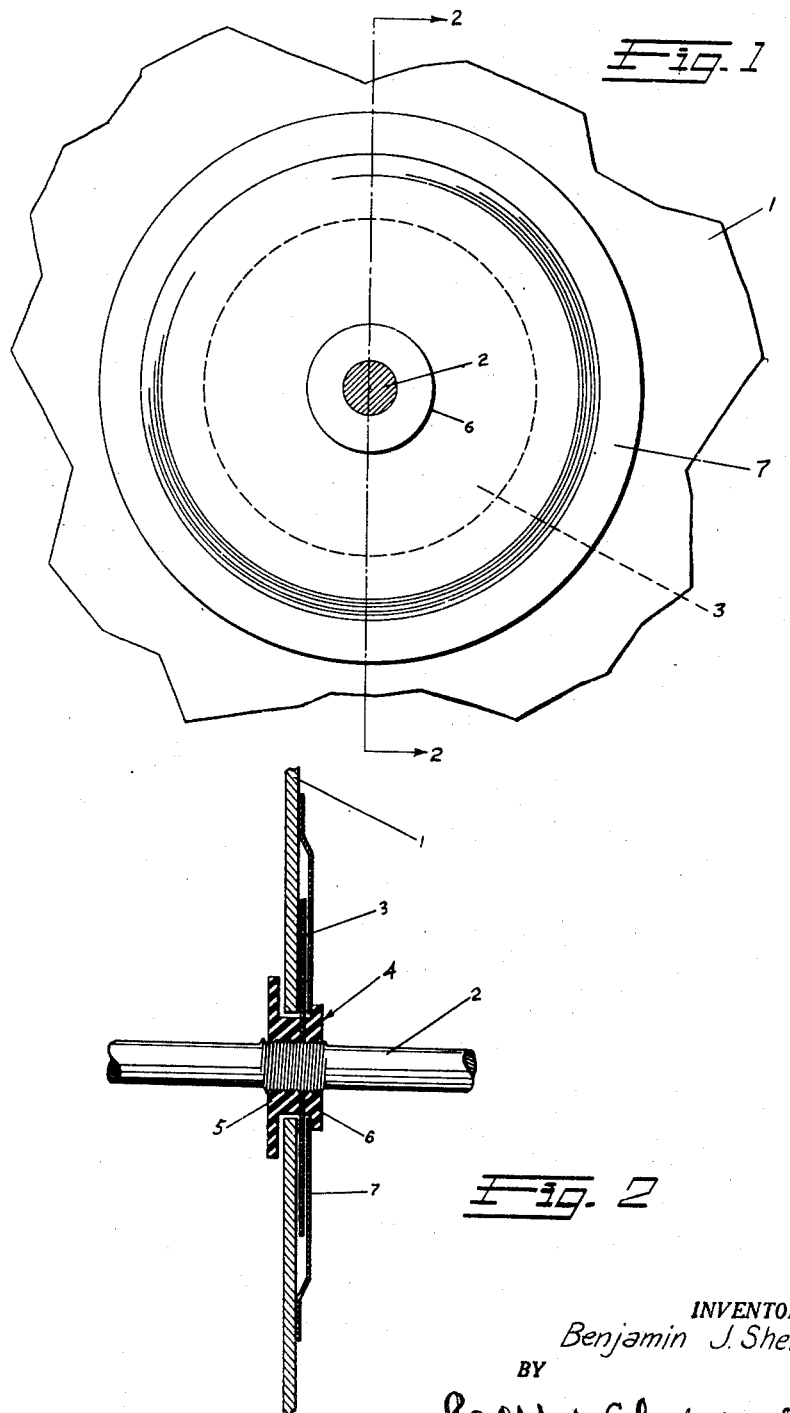
INVENTOR.
Benjamin J. Shelton
BY
Ralph L. Chappell
ATTORNEY Patented Mar. 8, 1949

2,463,568

UNITED STATES PATENT OFFICE 2,463,568

SHAFT SEAL CONSTRUCTION

Benjamin Jarnigan Shelton, United States Navy

Application August 11, 1945, Serial No. 610,388

5 Claims. (Cl. 286—11)

(Granted under the act of March 3, 1883, as amended April 30, 1928; 370 O. G. 757)

The present invention relates to a shaft seal and has special reference to a shaft seal for use in immersion-proof devices.

More particularly, this invention relates to a moistureproof construction for application to various shafts on radios and other equipment provided with moistureproof cases to prevent the entrance of moisture or water vapor if such equipment should be immersed in water.

It occasionally happens, for example during amphibious landings, that some of the equipment being taken ashore is immersed in the water. This generally results in rendering inoperative equipment such as radios, generators and the like.

With the present seal, all leakage around the shafts is prevented even when the equipment is submerged to a considerable depth.

An object of the invention is to provide a moistureproof shaft seal.

Another object is to provide such a seal which prevents leakage of any moisture when the device in which it is employed is submerged to a considerable depth.

A further object is to provide such a seal that offers a minimum of frictional opposition to rotary motion of the shaft.

Further objects and advantages as well as its construction, arrangement and operation, will be apparent from the following description and claims in connection with the accompanying drawings, in which, Fig. 1 is a front elevational view of a shaft seal construction embodying the present invention, and Fig. 2 is a cross-sectional view partially in elevation taken on the line 2—2 of Fig. 1.

There is shown a barrier 1 which can be the front portion or panel of the case containing a radio or other equipment. The whole case is preferably of moistureproof construction. Projecting through the barrier 1 is a shaft 2 which can be used for controlling, operating or tuning the equipment within the case 1. Mounted on the shaft 2 by suitable means forming a watertight connection therewith is a substantially radially extending baffle 3 which is preferably in the form of a disc. One form of connecting means is shown in Fig. 2.

The portion of the shaft 2 lying in the opening provided in the barrier 1 can be threaded and a collar 4 having the disc embedded therein screwed onto this portion of the shaft. The disc is so positioned that it extends substantially radially of the shaft adjacent the outer face of the barrier 1. The collar 4 is preferably provided with a flange at each end and is formed in two parts, 5 and 6, to permit it to be placed on the shaft with a flange at each side of the barrier 1. Parts 5 and 6 can be made of rubber or other suitable material. The disc 3 is positioned between the two collar sections. The foregoing construction provides a watertight connection between the disc 3 and the shaft 2. Any other suitable means for connecting the disc 3 to the shaft 2 can be employed.

A cover plate 7, which is preferably circular with a diameter greater than that of the disc 3 and having a central opening for receiving the shaft 2 and collar 4, is positioned adjacent to and overlying the disc 3. The perimeter of the cover plate 7 is attached to the outer face of the barrier 1 by welding, soldering or any other suitable means that forms a watertight connection between the barrier 1 and the cover plate 7. With this construction, the disc 3 can be rotated within the space between the cover plate 7 and the barrier 1.

In order to prevent any water or moisture from passing into the case around the shaft, the space about the disc 3 between the cover plate 7 and the barrier 1 is filled with a suitable grease or grease-like material, such as a silicone, that is of substantially the same consistency as petroleum jelly and is moisture resistant, nonhygroscopic, and that does not dry or harden when subjected to elevated temperatures and retains its consistency over a wide range of temperatures.

If desired, in order to provide a seal that withstands extremely great pressures, a plurality of cover plates and discs can be employed on the same shaft. However, this will seldom be necessary as a single seal remains watertight when submerged twenty five feet or more under the surface of the water.

With the present seal construction, positive alignment between the shaft 2 and barrier 1 is not required in order to maintain the seal absolutely tight. Moreover, when a waterproof case equipped with the present seal construction is immersed, the pressure of the water against the cover plate 7 tends to increase the integrity of the seal.

The seal comprises few parts and withstands long hard usage without getting out of order. It prevents the passage of gas, air or liquids and can be used in connection with shafts of any size for a large number of purposes.

Changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A seal for a barrier having an opening and an element extending through the opening and movable with respect to the barrier, said seal comprising a radially extending baffle mounted on the element and disposed substantially parallel to a surface of the barrier, locking means on the element for engaging opposite sides of the baffle to lock the baffle for movement with the element and to form a watertight seal with the element, said locking means having a radially extending flange disposed in spaced relation from the baffle on the side of the baffle remote from the barrier, and a cover secured at its periphery to the side of the barrier adjacent the baffle and radially outward from the periphery of the baffle, said cover extending radially inward into the space between the baffle and the flange of the locking means, said locking means being adjustable along the element to position selectively the baffle along the element.

2. A seal for a barrier having an opening and a shaft extending through the opening and rotatable with respect to the barrier, said seal comprising a radially extending baffle mounted on the shaft and disposed substantially parallel to one surface of the barrier, locking means on the shaft for engaging opposite sides of the baffle to lock the baffle for rotation with the shaft and to form a watertight seal with the shaft, said locking means having a radially extending flange disposed in spaced relation from the baffle on the side of the baffle remote from the barrier, and a cover secured at its periphery to the side of the barrier adjacent the baffle and radially outward from the periphery of the baffle, said cover extending radially inward into the space between the baffle and the flange of the locking means, said cover being in sliding contact with said flange.

3. A seal for a barrier having an opening and a shaft extending through the opening and rotatable with respect to the barrier, said seal comprising a radially extending baffle mounted on the shaft and disposed substantially parallel to one surface of the barrier, locking means on the shaft for engaging opposite sides of the baffle to lock the baffle for rotation with the shaft and to form a watertight seal with the shaft, said locking means having a radially extending flange on each side of the baffle and in spaced relation from the baffle, the portion of the barrier defining the opening extending into the space between one flange and the baffle, a cover secured at its periphery to the side of the barrier adjacent the baffle and radially outward from the periphery of the baffle, said cover extending radially inward into the space between the baffle and the other flange, and a body of sealing compound about the disc between the cover and the barrier, said locking means being adjustable along the shaft to position selectively the baffle along the shaft.

4. A seal for a barrier having an opening and a shaft extending through the opening and rotatable with respect to the barrier, said seal comprising a radially extending baffle mounted on the shaft and disposed substantially parallel to one surface of the barrier, means for locking the baffle for rotation with the shaft and forming a watertight seal with the baffle, said means having a radially extending flange disposed in spaced relation from and substantially parallel to the baffle on the side of the baffle remote from the barrier, and a cover secured at its periphery to the side of the barrier adjacent the baffle and radially outward from the periphery of the baffle, said cover extending radially inward into the space between the baffle and the flange of the locking means, the locking means being adjustable relative to the shaft to position selectively the baffle relative to the shaft.

5. A seal for a barrier having an opening and an element extending through the opening and movable with respect to the barrier, said seal comprising a baffle mounted on the element and disposed substantially parallel to a surface of the barrier, means for locking the baffle for movement with the element and forming a watertight seal with the element, said means having a flange disposed in spaced relation from and substantially parallel to the baffle on the side of the baffle remote from the barrier, and a cover secured at its periphery to the side of the barrier adjacent the baffle and outward from the periphery of the baffle, said cover extending inward into the space between the baffle and the flange of the locking means, this locking means being adjustable relative to the element to position selectively said baffle relative to said element.

BENJAMIN JARNIGAN SHELTON.

REFERENCES CITED

The following references are of record in the file of this patent:

UNITED STATES PATENTS

| Number | Name | Date |
|---|---|---|
| 321,710 | Garton | July 7, 1885 |
| 602,374 | Stivers | Apr. 12, 1898 |
| 1,001,687 | Richards | Aug. 29, 1911 |
| 1,105,268 | Gohlke | July 28, 1914 |
| 1,594,838 | Kegresse | Aug. 3, 1926 |
| 1,749,590 | Krarup | Mar. 4, 1930 |
| 1,919,248 | Murphy | July 25, 1933 |
| 2,248,405 | Freeman | July 8, 1941 |